(12) United States Patent
Shelest et al.

(10) Patent No.: US 7,620,987 B2
(45) Date of Patent: Nov. 17, 2009

(54) OBFUSCATING COMPUTER CODE TO PREVENT AN ATTACK

(75) Inventors: Art Shelest, Sammamish, WA (US); Gregory D. Hartrell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 11/203,676

(22) Filed: Aug. 12, 2005

(65) Prior Publication Data

US 2007/0039048 A1  Feb. 15, 2007

(51) Int. Cl.
*G06F 11/00* (2006.01)
*G06F 11/30* (2006.01)

(52) U.S. Cl. .................................. 726/22; 713/189
(58) Field of Classification Search .................. 726/22; 713/189
See application file for complete search history.

(56) References Cited

U.S. PATENT DOCUMENTS

| | | | | |
|---|---|---|---|---|
| 5,559,884 | A | | 9/1996 | Davidson et al. |
| 6,006,328 | A * | 12/1999 | Drake | 726/23 |
| 6,009,525 | A * | 12/1999 | Horstmann | 726/22 |
| 6,205,550 | B1 * | 3/2001 | Nardone et al. | 726/22 |
| 6,643,775 | B1 * | 11/2003 | Granger et al. | 713/190 |
| 6,668,325 | B1 * | 12/2003 | Collberg et al. | 713/194 |
| 6,782,478 | B1 * | 8/2004 | Probert | 713/191 |
| 6,868,495 | B1 * | 3/2005 | Glover | 713/190 |
| 7,051,200 | B1 * | 5/2006 | Manferdelli et al. | 713/153 |
| 7,054,443 | B1 * | 5/2006 | Jakubowski et al. | 380/28 |
| 7,080,257 | B1 * | 7/2006 | Jakubowski et al. | 713/187 |
| 7,237,123 | B2 * | 6/2007 | LeVine et al. | 713/193 |
| 7,254,586 | B2 * | 8/2007 | Chen et al. | 713/190 |
| 7,263,722 | B1 * | 8/2007 | Luo et al. | 726/26 |
| 7,370,319 | B2 * | 5/2008 | Pensak et al. | 717/124 |
| 7,383,443 | B2 * | 6/2008 | Zeman et al. | 713/190 |
| 7,415,618 | B2 * | 8/2008 | de Jong | 713/190 |
| 7,421,586 | B2 * | 9/2008 | Luo et al. | 713/187 |
| 7,424,620 | B2 * | 9/2008 | de Jong | 713/190 |
| 7,430,670 | B1 * | 9/2008 | Horning et al. | 713/190 |
| 7,454,323 | B1 * | 11/2008 | Bain | 703/13 |
| 7,539,875 | B1 * | 5/2009 | Manferdelli et al. | 713/189 |
| 2002/0138748 | A1 * | 9/2002 | Hung | 713/190 |
| 2003/0191938 | A1 * | 10/2003 | Woods et al. | 713/165 |
| 2004/0003264 | A1 * | 1/2004 | Zeman et al. | 713/190 |
| 2004/0003278 | A1 * | 1/2004 | Chen et al. | 713/200 |
| 2005/0021613 | A1 * | 1/2005 | Schmeidler et al. | 709/203 |
| 2005/0204348 | A1 * | 9/2005 | Horning et al. | 717/140 |
| 2005/0210275 | A1 * | 9/2005 | Homing et al. | 713/190 |
| 2006/0005021 | A1 * | 1/2006 | Torrubia-Saez | 713/167 |
| 2006/0031686 | A1 * | 2/2006 | Atallah et al. | 713/190 |
| 2006/0195703 | A1 * | 8/2006 | Jakubowski | 713/190 |
| 2006/0195906 | A1 * | 8/2006 | Jin et al. | 726/26 |
| 2007/0288715 | A1 * | 12/2007 | Boswell et al. | 711/164 |

* cited by examiner

*Primary Examiner*—Emmanuel L Moise
*Assistant Examiner*—Techane J Gergiso
(74) *Attorney, Agent, or Firm*—Perkins Coie LLP (57) ABSTRACT

A method and system for obfuscating computer code of a program to protect it from the adverse effects of malware is provided. The obfuscation system retrieves an executable form of the computer code. The obfuscation system then selects various obfuscation techniques to use in obfuscating the computer code. The obfuscation system applies the selected obfuscation techniques to the computer code. The obfuscation system then causes the obfuscated computer code to execute.

13 Claims, 10 Drawing Sheets

OBFUSCATING COMPUTER CODE TO PREVENT AN ATTACK

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs, operating systems, and other computer programs executing on those computer systems. One of the most destructive methods of attacking a computer system has been to modify portions of the operating system with software that may perform many of the same functions of the operating system, but also includes malicious functions. These modifications can be either to replace portions of the operating system or to add new programs that are automatically started by the operating system. Such software is referred to as "malware" because of its malicious nature. Once malware is installed, the operating system is "infected" and the malware can control all aspects of the computer system. Such malware includes RootKits, Trojan horses, keystroke loggers, and so on. For example, the malware could intercept keystrokes that a user enters (e.g., a password) and report them to another computer system. As another example, the malware could be a worm that launches a self-propagating attack that exploits a vulnerability of a computer system by taking control and using that computer system to find other computer systems with the same vulnerability and launch attacks (i.e., sending the same worm) against them. To launch an attack that exploits the same vulnerability, the malware assumes that all to-be-attacked computer systems locate their resources in the same way. For example, malware may operate by overwriting an entry in a system call table so that system calls through that entry are routed to the malware. The malware may assume that the system call table is stored at the same location of each computer system or that its location can be found in the same way (i.e., indirectly through a memory location that contains a pointer to the table).

In addition to infecting an operating system, malware can also infect various applications. One virus, known as the "Slammer" virus, infects SQL server software. This virus takes control of the server by sending a SQL message that causes a buffer to overflow, which causes the data of the message to overwrite the server's stack with instructions including the address of a memory location (e.g., a return address stored in the stack) to which the SQL server jumps. When the SQL server jumps to the memory location specified by the overwritten address, the malware starts to execute. Because the SQL server executes with a high privilege level, the malware can effectively take control of the server. Once the malware takes control, it can access application and system resources to perform its malicious behavior. The Slammer virus relies on the information of each server's stack being stored in the same way so that it knows where to store its address to effect the taking over of the server.

Since all installations of a certain version of a program (e.g., application or an operating system) are typically identical, once a hacker develops malware to infect a program, that malware can be used to infect all installations of the program in the same way.

SUMMARY

A method and system for obfuscating computer code of a program to protect it from the adverse effects of malware is provided. The obfuscation system retrieves an executable form of the computer code. The obfuscation system then selects various obfuscation techniques to use in obfuscating the computer code. The obfuscation system applies the selected obfuscation techniques to the computer code. When the obfuscation techniques are applied to the computer code, the obfuscation system may need to fix up the computer code to ensure that the obfuscated computer code has functionally the same behavior. The obfuscation system then causes the obfuscated computer code to execute. Malware may find it difficult to find resources of the obfuscated code that are needed to infect the code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for obfuscating computer code of a program to protect it from the adverse effects of malware is provided. In one embodiment, the obfuscation system retrieves an executable form of the computer code. For example, if the computer code is part of an application program, then when the application program is to be executed, the obfuscation system may load the executable file for that application program into memory for execution. The obfuscation system then selects various obfuscation techniques to use in obfuscating the computer code. For example, one obfuscation technique may be to rearrange portions of the executable code so that its behavior is still functionally the same, but malware may find it difficult to locate certain resources of the code because of the rearranging. The obfuscation system then applies the selected obfuscation techniques to the computer code. When the obfuscation techniques are applied to the computer code, the obfuscation system may need to fix up the computer code (e.g., change references to moved functions or moved tables) to ensure that the obfuscated computer code has functionally the same behavior. The obfuscation system then causes the obfuscated computer code to execute. In this way, it may be difficult for malware to find resources of the obfuscated code that are needed to infect the code. For example, if SQL server code had been obfuscated by adding random padding onto the stack, then the Slammer virus would not have been able to rely on the stack of each SQL server having its data stored in exactly the same position relative to the top of the stack. As another example, if certain system calls or pointers to the system calls of the operating system were moved to different locations on each SQL server, then the Slammer virus would not have been able to reliably invoke a desired system call. Although the Slammer virus may have caused obfuscated SQL server code whose buffer was overwritten to fail, the server would have likely failed without spreading the virus, which would have minimized the collective adverse effects of the virus on SQL servers.

The obfuscation system may obfuscate computer code at different times depending on computational expense versus security trade-offs. The obfuscation system may obfuscate the operating system or an application program at the time of installation on a computer system. For example, the obfuscation system may be implemented as a component of an installer program. Before the program to be installed is stored on a storage device of the computer system, the obfuscation system is invoked by the installer to obfuscate the computer code of the program. The obfuscation system may randomly select the obfuscation techniques to apply to a program so that each installation of the program will be obfuscated in a different way. The installer then stores that obfuscated computer code on the storage device of the computer system. Thus, each installation of a program will be different, but each time the program is executed, its computer code has the same obfuscation as the last time it was executed. Alternatively or in addition, the obfuscation system may obfuscate the computer code of a program each time that it is loaded for execution. For example, the obfuscation system may be implemented as a component of the loader program. When a program is to be loaded for execution, the loader loads the executable code of the program into memory, randomly selects obfuscation techniques, applies those selected obfuscation techniques to the executable code, and then starts the execution of the program. Since the obfuscation system randomly selects the obfuscation techniques to apply, each execution instance of the program will be different. Although the obfuscation of computer code at the time of execution may provide a higher degree of security against malware than obfuscation only at installation, the overhead of performing the obfuscation at execution time may outweigh the additional security benefits.

In one embodiment, the obfuscation system may randomly select the obfuscation techniques that are to be applied to a program. This random selection helps ensure that each installation or executable instance of the program will be obfuscated in a different way, making it difficult for malware to rely on the program storing and accessing resources in a uniform manner. The obfuscation techniques may include equivalent code sequence substitution, reordering code blocks, reordering import tables, varying stack frames, inserting inert instructions, reordering static data, renaming binaries, encrypting computer code, and so on as described below in more detail.

The obfuscation technique of equivalent code sequence substitution seeks to change the location of code blocks within a program so that malware cannot rely on fixed locations of code blocks. If malware cannot rely on a function being at a certain location, then it may have no effective way of invoking that function. The equivalent code sequence substitution may apply many different substitution techniques to alter the size of a code block and thus change the location of subsequent code blocks. For example, one substitution technique may replace an addition operation with a more complex operation that generates the same result. For example, an instruction that increments the value of a register may be replaced by a sequence of instructions that adds 2 to the register value and then subtracts 1 from the register value. Because the substitution results in code blocks being relocated, the obfuscation system needs to track transfer instructions (e.g., jumps and calls) and then fix up those instructions to reflect the relocation of their targets.

The obfuscation technique of reordering code blocks seeks to hide the location of code blocks that may be needed by the malware. A code block may be a basic block in the sense that it is a sequence of instructions that has only one entry point from outside the code block. Although basic blocks are generally considered to be the shortest sequences of such instructions, several basic blocks can be combined into a larger code block that has only one entry point from outside the code block. The ordering of code blocks is important to correct operation of a program because each code block that does not end in jump instruction may rely on the first instruction of the following code block being executed after its last instruction. Thus, when code blocks are reordered, the obfuscation system may need to insert jump instructions to ensure that the execution order of the code blocks (i.e., code path) is preserved, although the in-memory order of the code blocks is not preserved. In addition, the obfuscation system needs to fix up transfer instructions to reflect the relocations of their target code blocks. By randomly reordering code blocks, the obfuscation system can help ensure that each installation or instance of a program has a unique arrangement of its code blocks. Alternatively or in addition, the obfuscation system can insert inert code blocks or instructions into the computer code to change the offset of a code block without affecting the behavior of the program. For example, the obfuscation system can insert loops that swap the location of data and then re-swaps the data back to its original location, insert no-operation instructions, insert instructions that increment useless variables, and so on.

The obfuscation technique of reordering import tables again seeks to change the ordering in memory of code blocks. The import table of an application program identifies code segments (e.g., dynamic link libraries) that are to be loaded into memory when the application program is executed. The loader typically loads the code segments into memory in the same order as they are identified in the import table. The obfuscation system may randomly reorder an import table so that a loader will load the code segments in a different order and thus at different locations. If code of the application program relies on a code segment being at a certain location, then the obfuscation system needs to fix up the transfer instructions.

The obfuscation technique of varying stack frames seeks to modify the locations of certain data on the stack such as return addresses. The obfuscation system can vary stack frames in different ways to make it difficult for malware to rely on a consistent ordering and location of stack data. For example, the obfuscation system may add instructions that add and remove padding bytes to the stack at various times during execution of the program. As another example, the obfuscation system may add additional call frames to the stack by, for example, adding a wrapper to a function call. Thus, when the function is invoked by the wrapper, the additional frame of the wrapper will cause the offsets to data on the stack to be changed. Malware that tries to access the data on the stack assuming a known offset (e.g., the Slammer virus) will likely fail when the stack frame is varied. The obfuscation system may wrap a function a variable number of times that is randomly selected to vary the outset from installation to installation or from execution to execution.

The obfuscation technique of renaming binaries seeks to make it difficult for malware to locate executable files of a storage medium that it seeks to infect. The obfuscation system may generate random names for the executable files or randomly swap the names of the executable files. To prevent malware from identifying a desired executable file by simply searching for code sequences within the executable files, rather than by name, the obfuscation system may encrypt the executable code. The obfuscation system can encrypt executable code that is stored on disk at installation and decrypt the executable code when it is to be executed. This encryption will help prevent malware from infecting the executable code that is stored on disk. Alternatively or in addition, the obfuscation system can store encrypted executable code in memory and decrypt portions of the executable code on an as-needed basis during execution. The encryption can be a complex encryption algorithm or a simple encryption algorithm (e.g., XOR'ing the code). The obfuscation system may add calls to a function to decrypt portions of the code before execution and calls to a function to encrypt portions of the code after execution.

In one embodiment, the obfuscation system may replace or wrap functions that are commonly invoked by malware with a function, referred to as a "minefield" function, that detects and reports the presence of the malware. The obfuscation system may copy the function to a new location and replace it with a minefield function that detects whether the invoking code is malware. If the invoking code is malware, then the minefield function may secretly report that the computer system has been infected or take some other anti-malware action. If the invoking code is not malware, then the minefield function may invoke the moved function to effect the normal behavior of the function.

Figure 1:
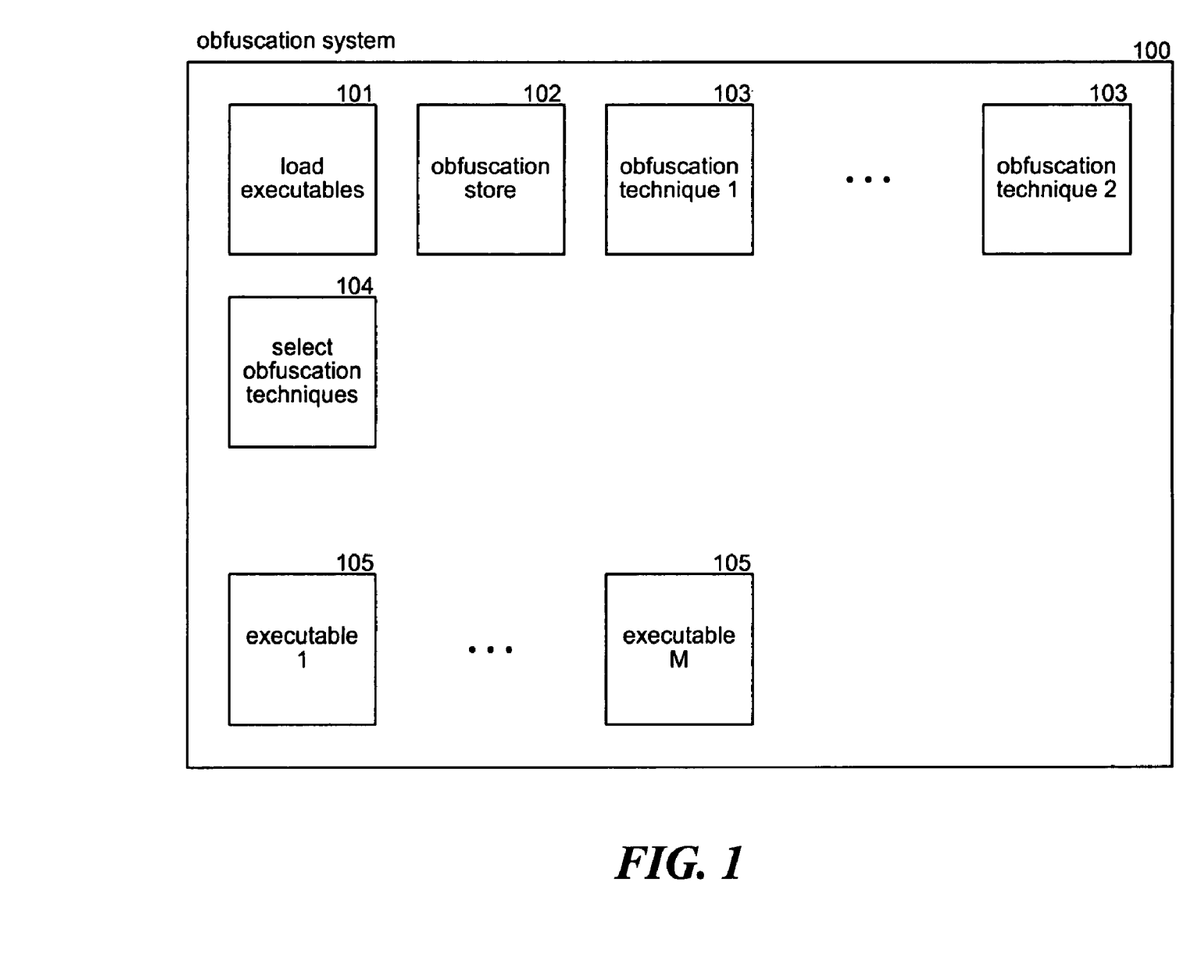
FIG. 1 is a block diagram illustrating components of the obfuscation system in one embodiment.

FIG. 1 is a block diagram illustrating components of the obfuscation system in one embodiment. The obfuscation system 100 may be implemented as a component of a loader. The loader may interact with the load executables component 101 to perform the obfuscation of executable code. The load executables component may invoke the select obfuscation techniques component 104 to randomly select the obfuscation techniques that are to be applied to the executable code. The load executables component may store information in the obfuscation store 102 that is needed when code segments of the program are dynamically loaded. For example, an application program may dynamically load plug-ins whose calls to functions need to be fixed up to reflect the obfuscated location of the functions. The load executables component then invokes the obfuscation techniques 103 to obfuscate the executable code that may be loaded from the executable files 105.

The computing device on which the obfuscation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the obfuscation system. In addition, the data structures and message structures may be stored or transmitted via a data transmission medium, such as a signal on a communications link. Various communications links may be used, such as the Internet, a local area network, a wide area network, or a point-to-point dial-up connection.

The obfuscation system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The obfuscation system may be implemented on computing devices that include personal digital assistants ("PDAs"), cell phones, consumer electronic devices (e.g., audio playback devices), game devices, and so on.

The obfuscation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
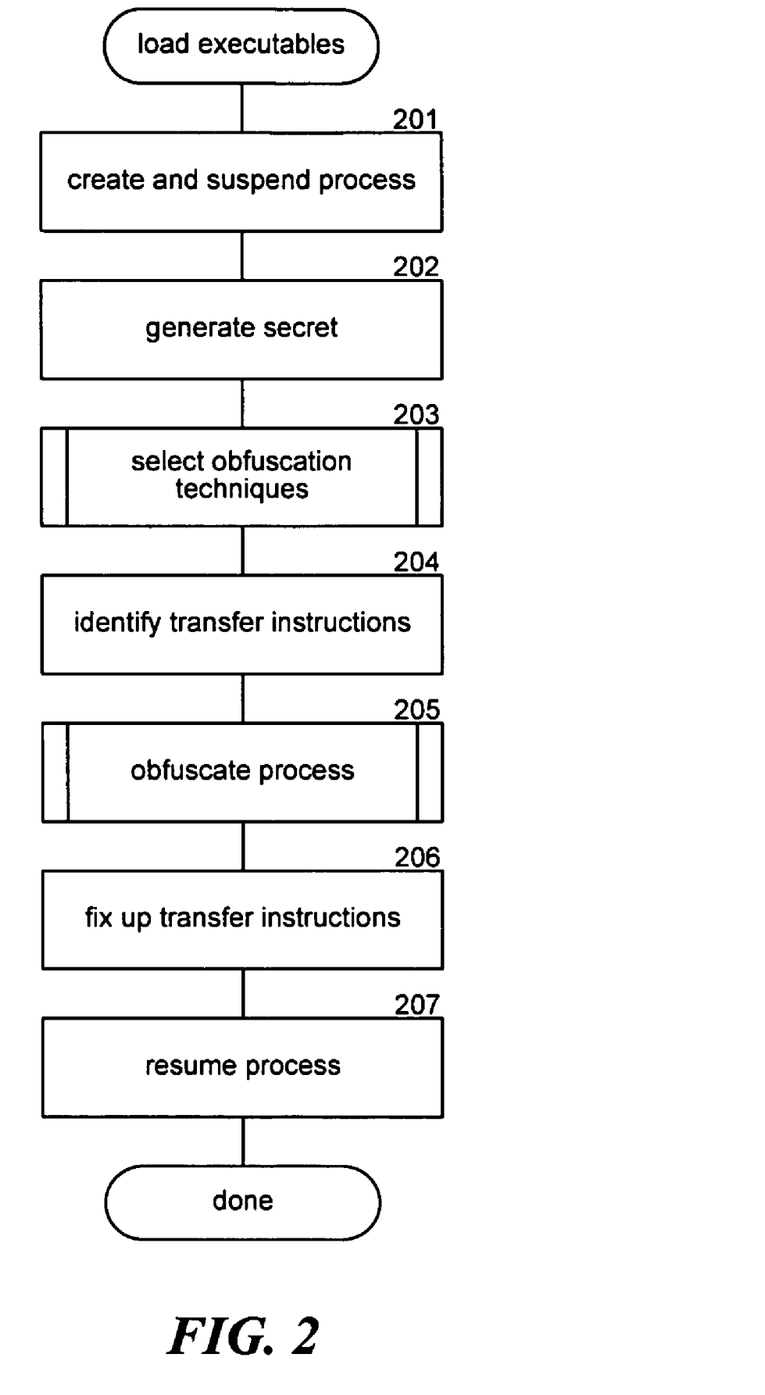
FIG. 2 is a flow diagram that illustrates the processing of the load executables component of the obfuscation system in one embodiment.

FIG. 2 is a flow diagram that illustrates the processing of the load executables component of the obfuscation system in one embodiment. The component creates a process, loads the executable code for the process, suspends the process, obfuscates the process, fixes up transfer instructions as appropriate, and then resumes execution of the process with the obfuscated executable code. In block 201, the component creates the process in which the executable code is to execute, loads the executable code, and then suspends the execution of the process. In block 202, the component generates a secret for the executable file that is unique to the computer system on which the executable file is to execute. The obfuscation system may use the secret as a seed to generate random numbers for controlling how to obfuscate the executable file. The component may generate a secret from various attributes of the computer system (e.g., identifier of network interface card) and other pseudo-random data (e.g., time of day) of the computer system. In block 203, the component invokes the select obfuscation techniques component passing the secret to randomly select the obfuscation techniques to be applied to the executable code. In block 204, the component identifies transfer instructions (e.g., function calls) and pointers that may need to be fixed up after the code is obfuscated. In block 205, the component applies the selected obfuscation techniques to obfuscate the executable code of the suspended process. In block 206, the component fixes up the transfer instructions and pointers as appropriate. Alternatively, each obfuscation technique may track and fix up the executable code that it affects. In block 207, the component resumes the process to execute the obfuscated code. The component then completes.

Figure 3:
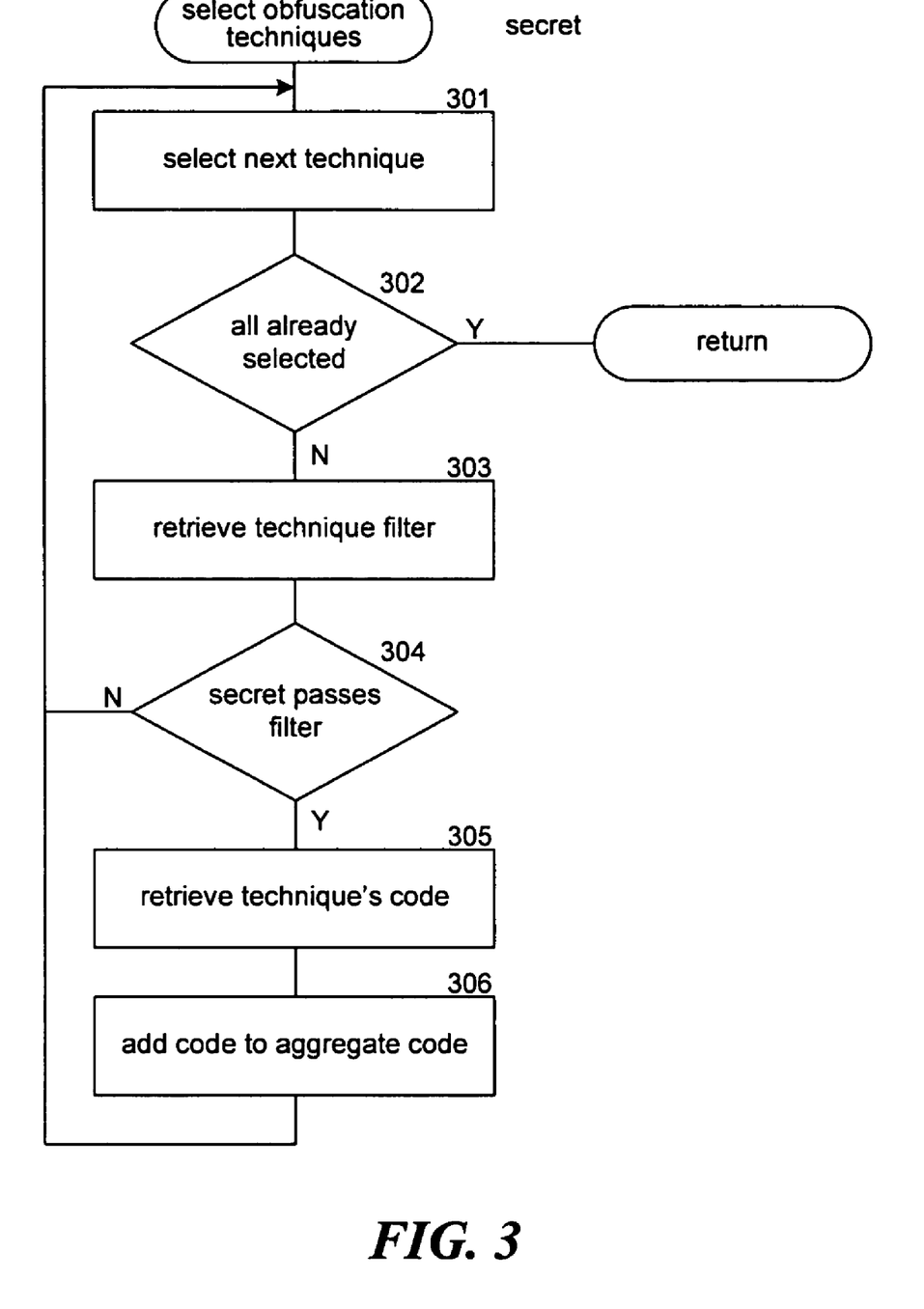
FIG. 3 is a flow diagram that illustrates the processing of the select obfuscation techniques component in one embodiment.

FIG. 3 is a flow diagram that illustrates the processing of the select obfuscation techniques component in one embodiment. The component may be passed a secret that is used as a seed to control the randomness of the obfuscation techniques that are selected. The secret may also be used by each obfuscation technique to randomize the obfuscation that is performed. In blocks 301-306, the component loops selecting each obfuscation technique and determining whether it should be randomly selected. In block 301, the component selects the next obfuscation technique. In decision block 302, if all the obfuscation techniques have already been selected, then the component returns, else the component continues at block 303. In block 303, the component retrieves the filter for the selected obfuscation technique. In decision block 304, if the secret passes the filter, then the component continues at block 305, else the component loops to block 301 to select the next obfuscation technique. The filter may be a function that is passed the secret and returns an indication of whether the obfuscation technique should be selected. In block 305, the component retrieves the code for the selected obfuscation technique. In block 306, the component adds the retrieved code to the code representing the aggregate of the selected obfuscation techniques. The component then loops to block 301 to select the next obfuscation technique.

Figure 4:
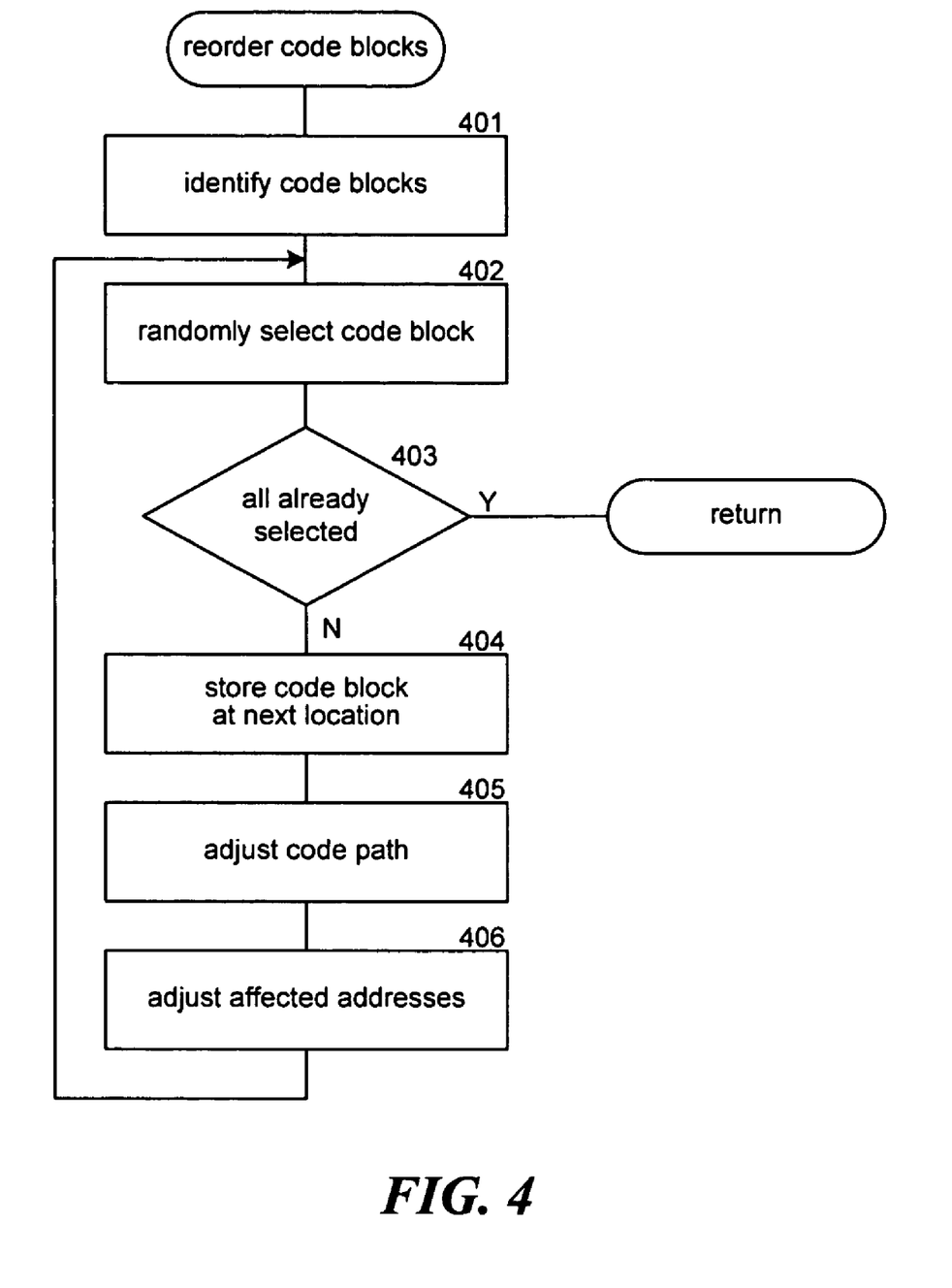
FIG. 4 is a flow diagram that illustrates the processing of the reorder code blocks obfuscation technique in one embodiment.

FIG. 4 is a flow diagram that illustrates the processing of the reorder code blocks obfuscation technique in one embodiment. In block 401, the component identifies the code blocks (e.g., basic blocks) of the executable code. In block 402, the component randomly selects a code block that has not yet been selected. In decision block 403, if all the code blocks have already been selected, then the component returns, else the component continues at block 404. In block 404, the component stores the selected code block at the next location of the obfuscated code. In block 405, the component performs any necessary adjustments to the code path to ensure that the execution order of the executable code is not changed. In block 406, the component adjusts any affected addresses and loops to block 402 to select the next code block.

Figure 5:
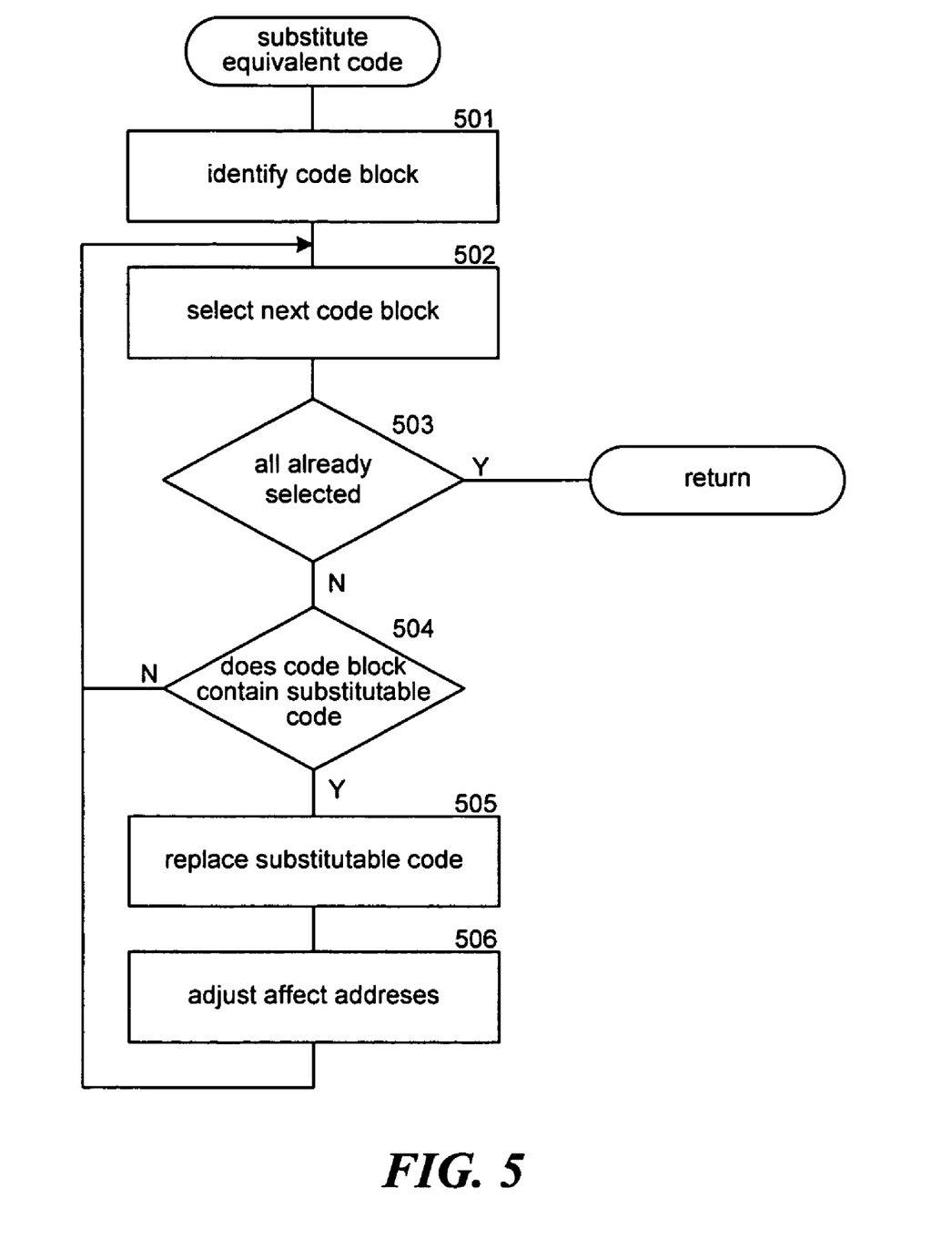
FIG. 5 is a flow diagram that illustrates the processing of the substitute equivalent code block component in one embodiment.

FIG. 5 is a flow diagram that illustrates the processing of the substitute equivalent code block component in one embodiment. In block 501, the component identifies the code blocks of the executable code. In block 502, the component selects the next code block of the executable code. In decision block 503, if all the code blocks have already been selected, then the component returns, else the component continues at block 504. In decision block 504, if the selected code block contains code that can be substituted, then the component continues at block 505, else the component loops to block 502 to select the next code block. In block 505, the component replaces the substitutable code of the selected code block. In block 506, the component performs any necessary adjustments to fix up addresses and then loops to block 502 to select the next code block.

Figure 6:
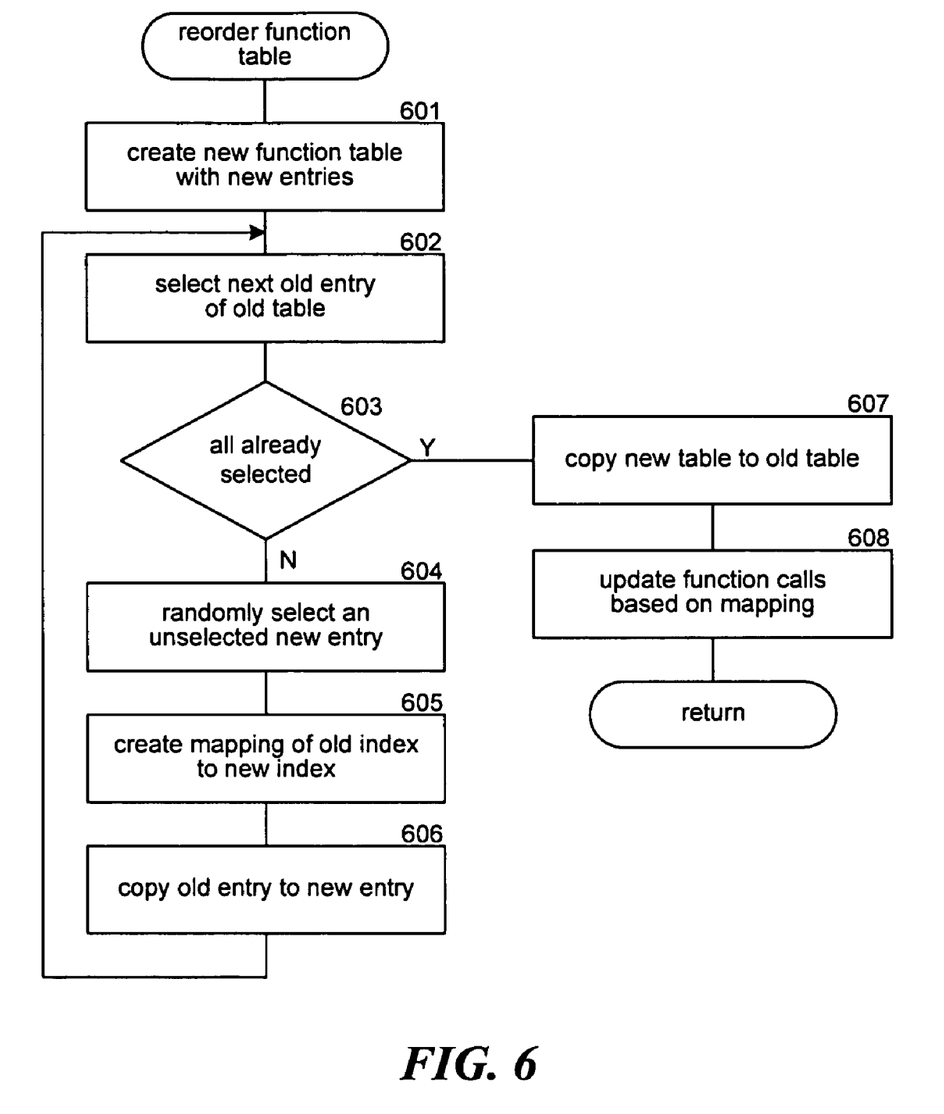
FIG. 6 is a flow diagram that illustrates the processing of the reorder function component in one embodiment.

FIG. 6 is a flow diagram that illustrates the processing of the reorder function component in one embodiment. In block 601, the component creates a new function table with new entries. In block 602, the component selects the next old entry of the old function table. In block 603, if all the old entries have already been selected, then the component continues at block 607, else the component continues at block 604. In block 604, the component randomly selects an unselected new entry of the new table. In block 605, the component creates a mapping of the index of the old entry to the index of the new entry. In block 606, the component copies the old entry to the new entry and then loops to block 602 to select the next old entry of the old function table. In block 607, the component copies the new function table to the old function table. In block 608, the component updates the target of any function calls based on the create mapping and then returns. The obfuscation system may use similar obfuscation techniques to reorder tables of pointers (e.g., to data structures) more generally.

Figure 7:
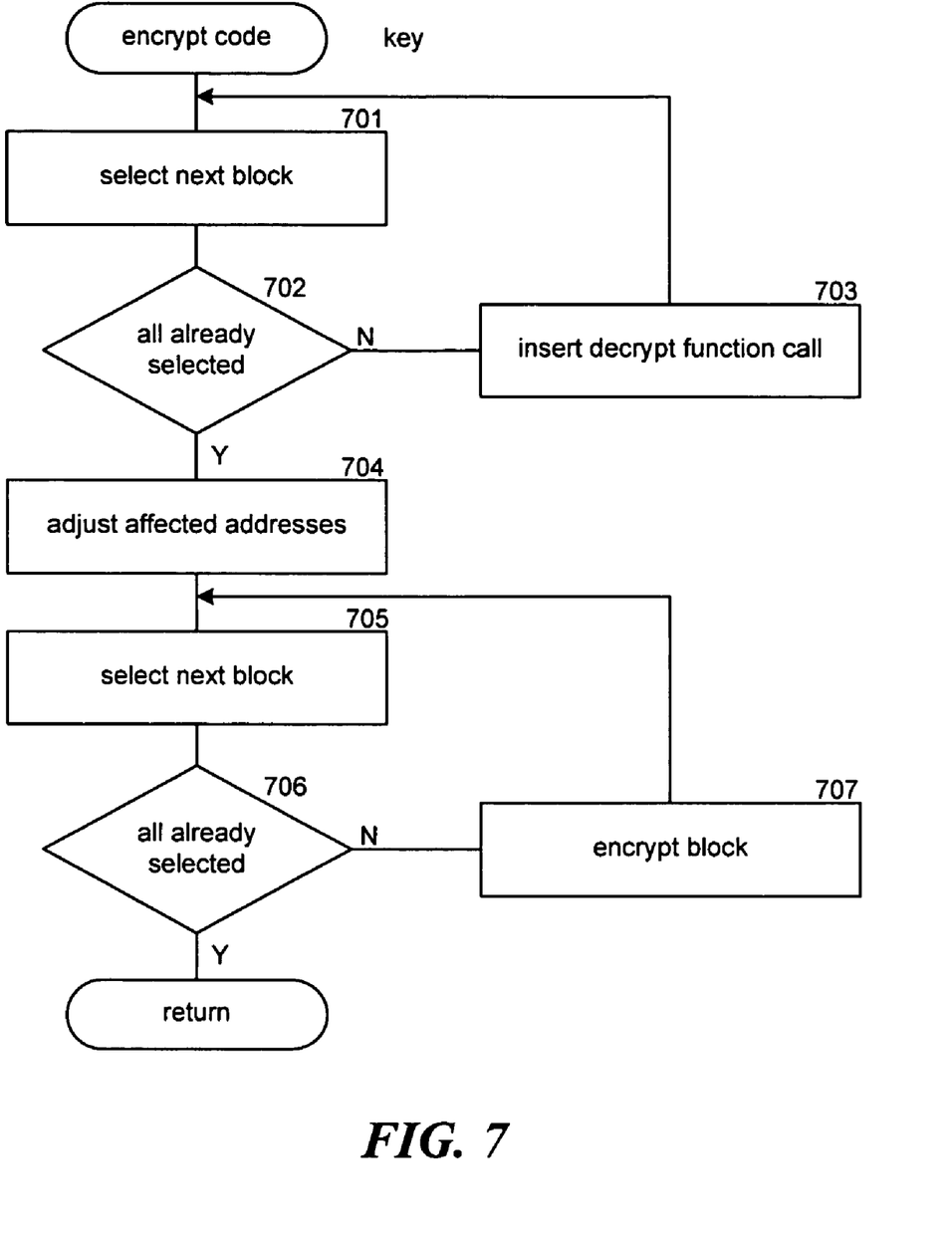
FIG. 7 is a flow diagram that illustrates the processing of the encrypt code component in one embodiment.

FIG. 7 is a flow diagram that illustrates the processing of the encrypt code component in one embodiment. The component is passed a key and encrypts the executable code using the key and inserts functions into the executable code for decrypting and encrypting the executable code as needed during execution. In blocks 701-703, the component loops inserting functions to decrypt and encrypt the code blocks. In block 701, the component selects the next code block. In decision block 702, if all the code blocks have already been selected, then the component continues at block 704, else the component continues at block 703. In block 703, the component inserts the decrypt and encrypt function calls as appropriate and loops to block 701 to select the next code block. In block 704, the component fixes up the affected addresses. In blocks 705-707, the component loops encrypting the code blocks. In block 705, the component selects the next code block. In decision block 706, if all the code blocks have already been selected, then the component returns, else the component continues at block 707. In block 707, the component encrypts the code block and then loops to block 705 to select the next code block.

Figure 8:
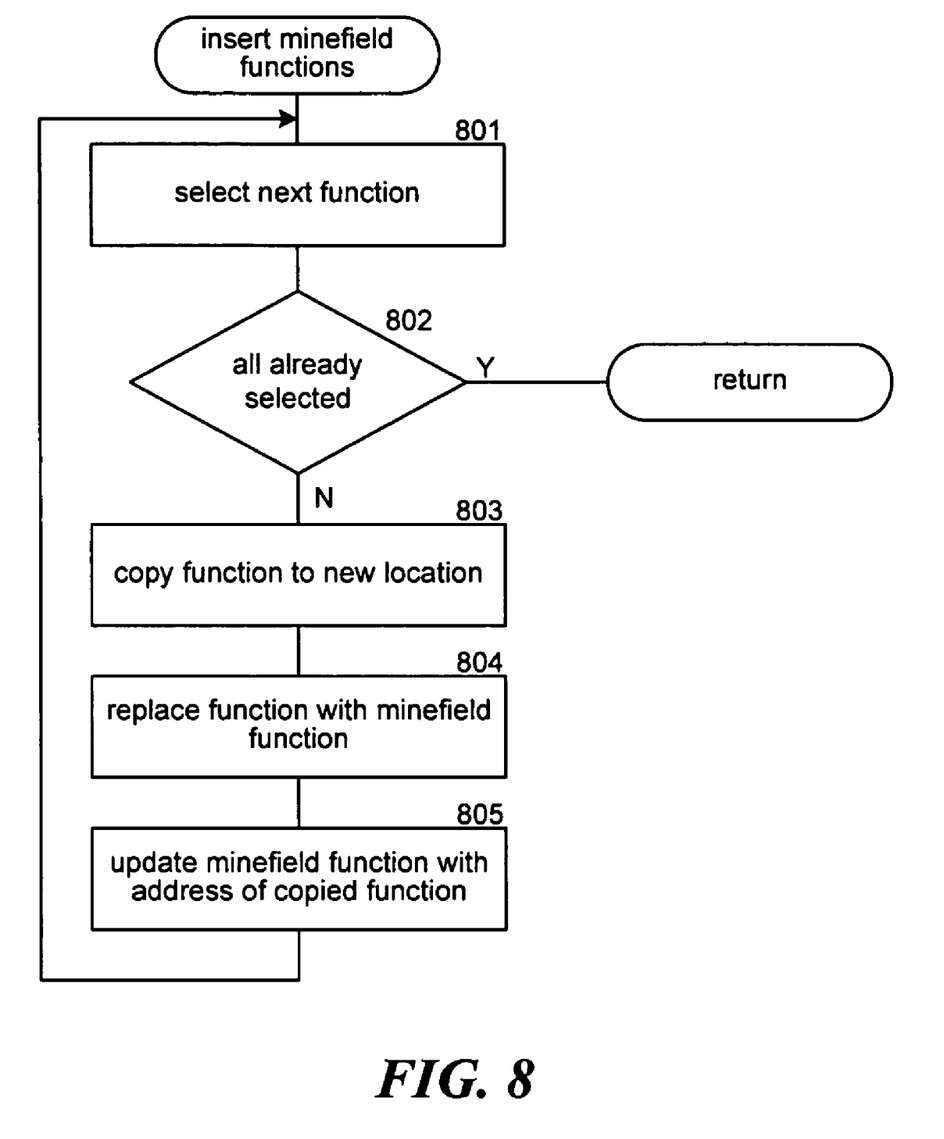
FIG. 8 is a flow diagram that illustrates the processing of the insert minefield functions component in one embodiment.

FIG. 8 is a flow diagram that illustrates the processing of the insert minefield functions component in one embodiment. In block 801, the component selects the next function that is to be replaced by a minefield function. In decision block 802, if all the functions have already been selected, then the component returns, else the component continues at block 803. In block 803, the component copies the selected function to a new location. In block 804, the component replaces the selected function with the minefield function. In block 805, the component updates the minefield function with the address of the copied function. The component then moves to block 801 to select the next function.

Figure 9:
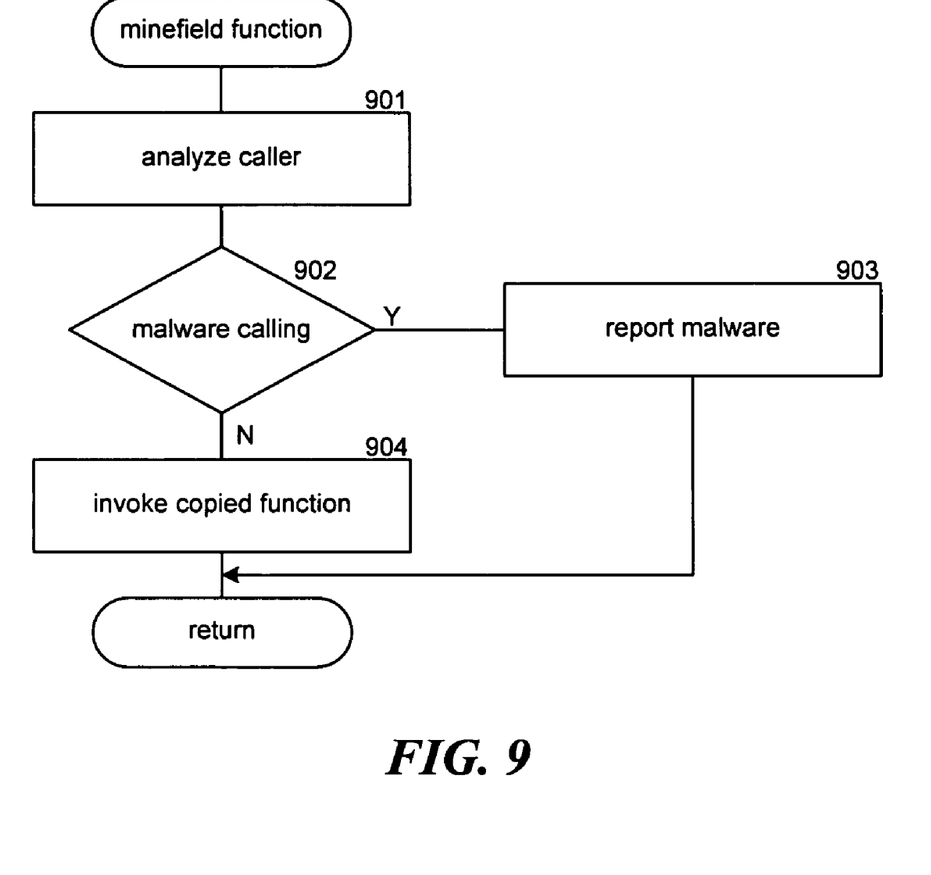
FIG. 9 is a flow diagram that illustrates the processing of a minefield function in one embodiment.

FIG. 9 is a flow diagram that illustrates the processing of a minefield function in one embodiment. In block 901, the function analyzes the caller to determine whether the minefield function is being called by malware. In decision block 902, if the function is being called by malware, then the function continues at block 903, else the function continues at block 904. In block 903, the function reports that malware has been detected and then completes. Alternatively, the minefield function may allow the function to complete normally by invoking the copied function. In block 904, the function invokes the copied function and then returns.

Figure 10:
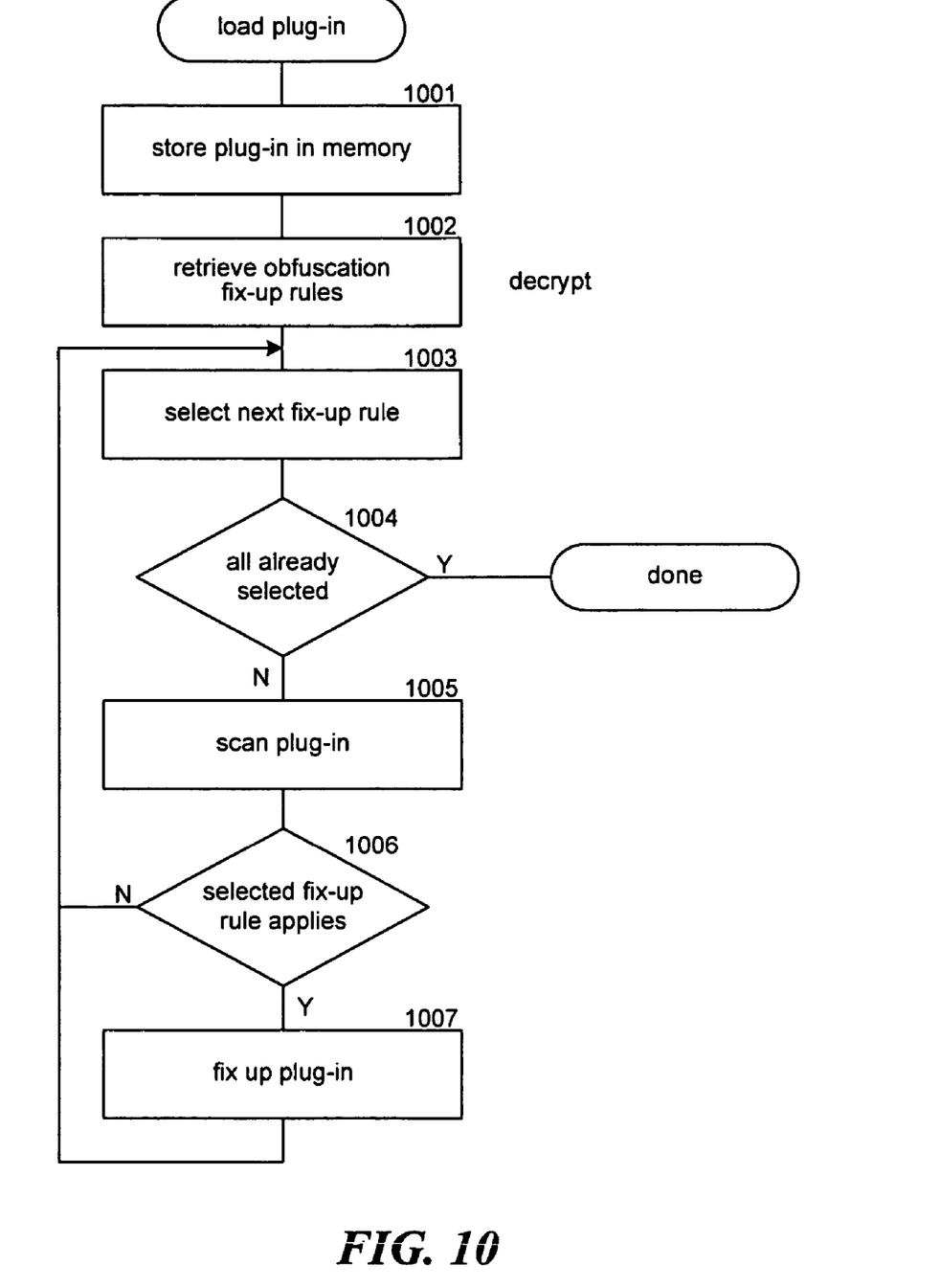
FIG. 10 is a flow diagram that illustrates the processing of the load plug-in component of the loader in one embodiment.

FIG. 10 is a flow diagram that illustrates the processing of the load plug-in component of the loader in one embodiment. In block 1001, the component stores the plug-in in memory. In block 1002, the component retrieves the obfuscation fix-up rules. These fix-up rules may include the mappings of addresses of functions from their old locations to their new locations. In block 1003, the component selects the next fix-up rule. In decision block 1004, if all the rules have already been selected, then the component completes, else the component continues at block 1005. In block 1005, the component scans the plug-in to determine whether any of the rules apply. In decision block 1006, if rules apply, then the component continues at block 1007, else the component loops to block 1003 to select the next rule. In block 1007, the component fixes up the plug-in and then loops to block 1003 to select the next rule. Malware typically does not load itself using a plug-in loader. Thus, malware that uses another mechanism to get loaded will not have its addresses fixed up.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the obfuscation system may be built into a program (e.g., application program) so that each time the program is to be loaded for execution the program automatically obfuscates itself in different ways (e.g., randomly selected obfuscation). The obfuscation system may also be implemented as a server that downloads obfuscated code to clients for execution. For example, an organization may have a server that maintains a copy of programs that are downloaded to its clients each time a user requests to execute a program. The server can obfuscate the executable code before download. This removes the obfuscation overhead from the client, which may not have significant computational power (e.g., a cell phone). In addition, since a program is not stored in the client persistently, the chances of being infected by malware are further reduced. Accordingly, the invention is not limited except as by the appended claims.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computing device having a memory and a processor for protecting a program from malware, the method comprising:
   retrieving executable code of the program;
   creating a process in which the retrieved executable code of the program is to execute;
   loading the executable code into memory of the process;
   suspending execution of the process;
   generating a secret based at least in part on attributes of the computing device;
   seeding a random number generator with the generated secret;
   identifying a plurality of obfuscation techniques;
   for each of the identified obfuscation techniques,
      based at least in part on a random number generated by the random number generator, determining whether the obfuscation technique should be applied to the executable code, and
      when it is determined that the obfuscation technique should be applied to the executable code,
         selecting the obfuscation technique, and
         retrieving the code for the selected obfuscation technique;
   identifying transfer instructions and pointers within the executable code;
   applying the retrieved code for each of the selected obfuscation techniques to the executable code loaded in memory to generate an obfuscated executable code of the program;
   when it is determined that an identified transfer instruction needs to be fixed up in the obfuscated executable code of the program, fixing up the identified transfer instruction so that the behavior of the obfuscated executable code of the program is functionally equivalent to that of the retrieved executable code; and
   resuming the process so that the obfuscated executable code of the program is executed on the processor.

2. The method of claim 1 wherein the obfuscation techniques are selected from a group consisting of reordering blocks, substituting equivalent code, reordering a function table, and encrypting code.

3. The method of claim 1 wherein the fixing up includes modifying invocations of functions through a function table.

4. The method of claim 1 including storing fix-up information relating to the obfuscated executable code so that when additional executable code is retrieved it can be fixed up so that it can correctly interface with the obfuscated executable code.

5. The method of claim 4 wherein the additional executable code is a plug-in.

6. A computer-readable storage medium containing instructions for controlling a computing device having a memory and a processor to protect computer code from malware, by a method comprising:
   in response to determining that the computer code is about to be installed on the computing device, obfuscating the computer code by:
      retrieving an executable form of the computer code,
      with a processor, generating a secret based at least in part on attributes of the computing device,
      seeding a random number generator based on the generated secret,
      for each of a plurality of obfuscation techniques,
         based at least in part on a random number generated by the seeded random number generator, determining whether the obfuscation technique should be applied to the retrieved executable form of the computer code; and
         when it is determined that the obfuscation technique should be applied to the retrieved executable form of the computer code,
            selecting the obfuscation technique, and
            applying the selected obfuscation technique to the retrieved executable form to generate an obfuscated executable form of the computer code that has a behavior that is functionally equivalent to the behavior of the retrieved executable form; and
      executing the obfuscated executable form of the computer code.

7. The computer-readable storage medium of claim 6 wherein the computer code is part of an operating system.

8. The computer-readable storage medium of claim 6 including fixing up the obfuscated executable form by modifying invocations of functions through a function table.

9. The computer-readable storage medium of claim 8 wherein the function table contains references to functions provided by an operating system.

10. The computer-readable storage medium of claim 6 including replacing a function of the executable form used by the malware with a function that reports access by the malware.

11. A computing system for protecting computer code from malware, comprising:
   a memory storing computer-executable instructions of
      a component that when executed selects obfuscation techniques to apply to the computer code by
         generating a secret based at least in part on attributes of the computing system;
         seeding a random number generator based on the generated secret; and
         for each of a plurality of obfuscation techniques,
            determining whether the obfuscation technique should be applied to the computer code based at least in part on a random number generated by the seeded random number generator; and
            when it is determined that the obfuscation technique should be applied to the computer code, selecting the obfuscation technique; and
      a component that applies the selected obfuscation techniques to the computer code to generate obfuscated computer code that has a behavior that is functionally equivalent to the behavior of the computer code before the obfuscation techniques were applied
      wherein the components are part of a loader that loads an executable form of the computer code; and
   a processor for executing the computer-executable instructions stored in the memory.

12. The computing system of claim 11 including a component that stores fix-up information relating to the obfuscated computer code so that before additional computer code is executed, it can be fixed up so that it can correctly interface with the obfuscated computer code.

13. The computing system of claim 11, further comprising:
- a component that creates a process in which the computer code is to execute;
- a component that loads the computer code into memory of the process;
- a component that suspends execution of the process; and
- a component that, after the obfuscated computer code has been generated, resumes execution of the process so that the obfuscated computer code is executed on the processor.

\* \* \* \* \*

UNITED STATES PATENT AND TRADEMARK OFFICE
CERTIFICATE OF CORRECTION

PATENT NO. : 7,620,987 B2  
APPLICATION NO. : 11/203676  
DATED : November 17, 2009  
INVENTOR(S) : Shelest et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Twenty-sixth Day of October, 2010

David J. Kappos  
*Director of the United States Patent and Trademark Office*